UNITED STATES PATENT OFFICE.

EMIL REINERT, OF STUTTGART, GERMANY, ASSIGNOR TO THE FIRM OF E. MERCK, OF DARMSTADT, GERMANY.

ANIMAL EXTRACT.

SPECIFICATION forming part of Letters Patent No. 586,623, dated July 20, 1897.

Application filed February 4, 1897. Serial No. 622,027. (No specimens.)

*To all whom it may concern:*

Be it known that I, EMIL REINERT, of the city of Stuttgart, Kingdom of Würtemberg, Germany, have invented a new and useful improvement in processes of preparing the prostata of animals, (mammals,) and the new and useful product so obtained, of which the following is a full, true, and exact description.

The object of this invention is to prepare a remedy for diseases of the prostate gland which ameliorates or cures the diseases of said gland. I have discovered that a remedy for such diseases can be obtained from the prostate gland of mammals suitably prepared.

The methods of preparing such remedy for application to the human system are various, but I prefer a treatment which will render the product aseptic.

I will describe various methods by which the object sought can be accomplished.

The prostate gland of mammals having been chopped fine is treated by cold digestion with twice its weight of ninety-five-per-cent. alcohol for twenty-four hours. The alcohol is then decanted, and the remaining sediment, when dried, may be used directly as it is deposited, or by preference it is mixed with an equal weight of table-salt, when the mixture can be dried and powdered.

Instead of the above process I may proceed as follows: The comminuted glands above referred to are digested with twice their bulk of glycerin, (15B.) The liquid extract thus obtained is precipitated with five times its volume of ninety-five-per-cent. alcohol. The precipitate is filtered off, dried, and powdered.

The advantage of the alcoholic treatment is to aid in preserving the product. It is possible, however, to use the glycerin precipitate, suitably dried, but it is not so advisable as the subsequent alcoholic precipitate.

I may also proceed as follows: The glands are digested with twice their bulk of water. The extract obtained is precipitated with five times its bulk of ninety-five-per-cent. alcohol. The precipitate is filtered off, dried, and powdered. In this case likewise it is possible to use the dried precipitate from water; but this is not so advisable.

The products so obtained are prepared for administration by the mouth, but may be otherwise administered to the patient.

What I claim as my invention, and desire to secure by Letters Patent, is—

1. The process of preparing a remedial agent from the prostate glands of animals, the same consisting in subjecting the comminuted glands to a suitable solvent, as glycerin or water, and precipitating the same with alcohol, and then drying and powdering the precipitate, substantially as described.

2. The remedial agent obtained from the prostate glands of animals, which is soluble in water or glycerin, insoluble in alcohol, in a dried, powdered and permanently-preserved condition, substantially as set forth.

3. The remedial agent obtained from the prostate glands of animals, which is soluble in water or glycerin, insoluble in alcohol, combined with salt and in a dried, powdered and permanently-preserved condition, substantially as set forth.

In testimony whereof I have signed my name to this specification in the presence of two subscribing witnesses.

E. REINERT.

Witnesses:
  M. RICHLEN,
  CHRISTIAN BAUER.